United States Patent [19]

Shirai

[11] Patent Number: 5,191,570
[45] Date of Patent: Mar. 2, 1993

[54] OPTICAL HEAD LOCATING MECHANISM FOR MAGNETICALLY LOCATING AN OPTICAL HEAD

[75] Inventor: Tomoyuki Shirai, Saitama, Japan

[73] Assignee: Asahi Kogaku Kogyo Kabushiki Kaisha, Tokyo, Japan

[21] Appl. No.: 610,112

[22] Filed: Nov. 7, 1990

[30] Foreign Application Priority Data

Nov. 7, 1989 [JP] Japan .................... 1-290893
Nov. 7, 1989 [JP] Japan .................... 1-290894

[51] Int. Cl.$^5$ .............................. G11B 7/12
[52] U.S. Cl. ............... 369/44.22; 369/44.14; 369/146; 359/824
[58] Field of Search ......... 369/44.22, 44.14, 33, 369/32, 13, 44.15, 44.16, 146–148; 360/106; 359/813, 814, 824, 825, 823, 196, 197–200

[56] References Cited

U.S. PATENT DOCUMENTS 4,654,519 3/1987 Ando .................... 369/44.14
4,799,766 1/1989 Estes .................... 369/44.22

FOREIGN PATENT DOCUMENTS 1-106372 4/1989 Japan .

OTHER PUBLICATIONS

English Language Abstract of Japanese Patent No. 1-106372.

Primary Examiner—Aristotelis M. Psitos
Assistant Examiner—Muhammad Edun
Attorney, Agent, or Firm—Sandler Greenblum & Bernstein

[57] ABSTRACT

An optical head locating mechanism for locating an optical head adapted to be positioned in an optical device at a desired point. The optical head locating mechanism comprises a first location device for floating the optical head and locating it at a desired position along a focusing direction, and a second in a direction orthogonal to a tracking direction. Thus, it becomes possible to smoothly and quickly move the optical head, and further it becomes possible to accurately locate the optical head.

25 Claims, 5 Drawing Sheets

OPTICAL HEAD LOCATING MECHANISM FOR MAGNETICALLY LOCATING AN OPTICAL HEAD

BACKGROUND OF THE INVENTION

The present invention relates to a head driving device, which is employable in a device having a head member such as an optical head, for example an optical disk device, an optical video disk player, a compact disk player and so forth, for driving a head along a first predetermined direction as well as along a second predetermined direction orthogonal to the first predetermined direction. The present invention relates more particularly to a head driving device capable of controlling the head so as to be located at standard positions along the first predetermined direction as well as along the second predetermined direction.

Figure 1:
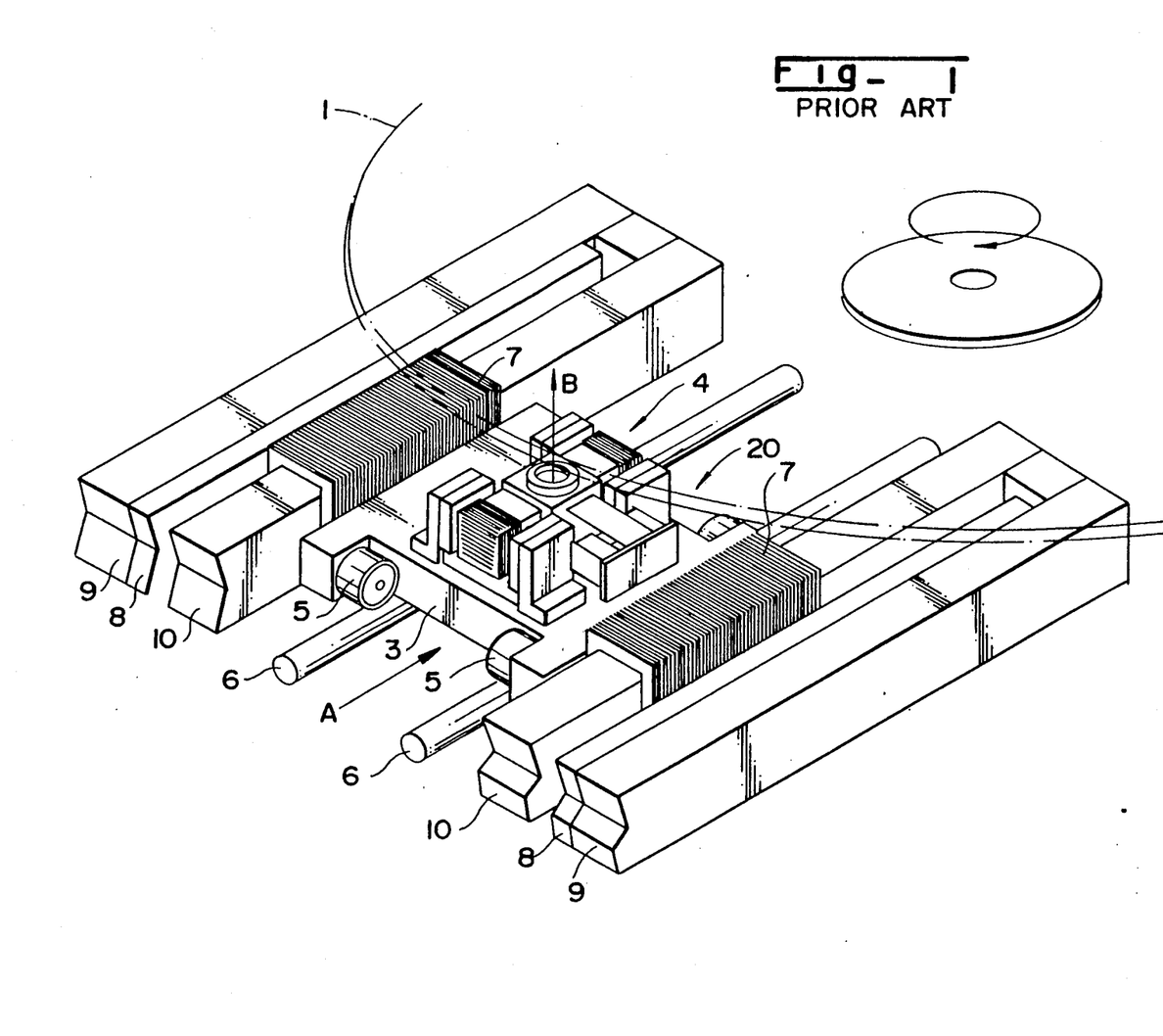
FIG. 1 shows a perspective view showing a conventional head driving device.

Conventionally, a head driving device, as shown in FIG. 1, has been known. In FIG. 1, numeral 1 indicates a disk arranged to be rotated by a well-known spindle motor, not shown. Numeral 3 indicates a carriage for mounting a head 4 as a fine actuator. Numerals 5, 5 indicate a pair of bearings for guiding the carriage 3 in a radial direction along a pair of guide rails 6, 6 arranged in parallel with each other. Numerals 7, 7 indicate a pair of air-cored coils respectively fixed at the both side walls of the carriage 3. A movable unit 20 comprises the above mentioned elements.

Numerals 8, 8 indicate a pair of permanent magnets respectively arranged in parallel to the pair of guide rails 6, 6. These permanent magnets 8, 8 are fixed to a pair of yokes 9, 9. A second pair of yokes 10, 10 are arranged to be located within the air-cored coils 7, 7. In this arrangement, a pair of magnetic fluxes are respectively generated from the pair of permanent magnets 8, 8 and propagated through the respective yokes 10, 10 and further propagated through the yokes 9, 9, and then finally returned to the permanent magnets 8, 8. A course actuator, for driving the movable unit 20, is composed of the above-mentioned components.

Figure 2:
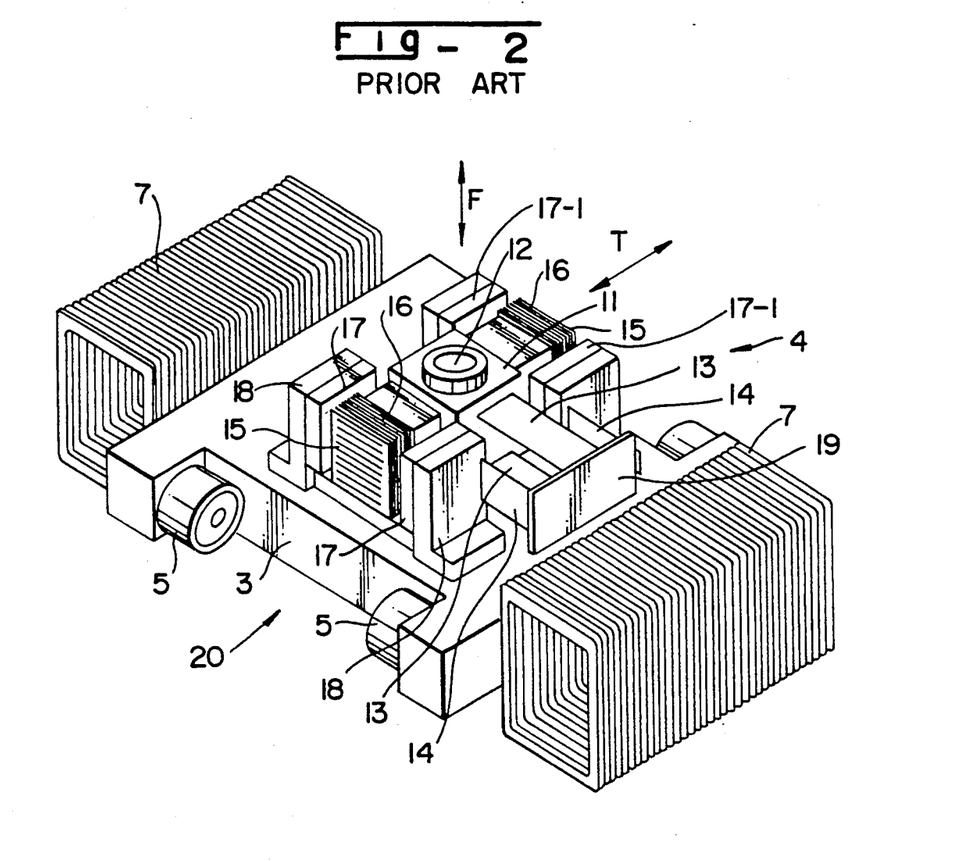
FIG. 2 shows an enlarged view showing a movable unit to be mounted on the head driving device shown in FIG. 1.

FIG. 2 shows an enlarged view of the above movable unit 20. Numeral 11 indicates a holder for holding an objective lens 12. At one side wall of the holder 11, i.e., the right side wall in the drawing, one of the side edges of a pair of leaf springs 13, 13 are horizontally provided, while the other side edges thereof are fixed to a connection plate 19, as shown in FIG. 2. The connection plate 19 is fixed to a pair of yokes 18, 18 by means of a pair of leaf springs 14, 14 vertically provided to the connection plate 19. Numerals 17, 17 and 17-1, 17-1 indicate two pairs of permanent magnets, and a pair of tracking coils 16, 16 and a pair of focusing coils 15, 15 are arranged to be located within a magnetic field generated by the pairs of permanent magnets 17, 17 and 17-1, 17-1.

The electrical and mechanical operation of the above structured head driving device will be described hereinafter, When a predetermined amount of current flows through the pair of air-cored coils 7, 7, each of the air-cored coils are respectively driven to move along a radial direction of disk 1 under the Fleming's left hand rule. Since each of the air-cored coils 7, 7 are fixed to the carriage 3, the carriage 3 is moved along the radial direction as the bearings are moved along the pair of guide rails 6, 6.

The position of the movable unit 20 in the radial direction is briefly controlled by means of the above driving operation of the carriage 3.

On the other hand, when a predetermined amount of current corresponding to a so-called tracking error signal is flowed through the pair of tracking coils 16, 16, the holder 11 to which the tracking coils 16, 16 are fixed is caused to move in a tracking direction indicated by an arrow "T" in FIG. 2, which is in parallel to the radial direction, since the tracking coils 16, 16 are located within the magnetic fields generated by the permanent magnets 17, 17 and 17-1, 17-1. When the holder 11 is moved, the leaf springs 14, 14 are elastically deformed about the fixing positions thereof to the yokes 18, 18.

By the above described construction, the objective lens 12, or more accurately, an optical spot caused by laser beam transmitted therefrom, is correctly located at the desired position opposed to the desired track on the disk 1. In other words, the objective lens 12 is briefly located on the desired track by means of the movement of the carriage 3, and is further accurately located by means of the deformation of the leaf springs 14, 14 when it is necessary, i.e., when the objective lens 12 is erroneously located by the movement of the carriage 3.

Further, when another predetermined amount of current corresponding to a so-called focusing error signal is flowed through the focusing coils 15, 15, the holder 11 is moved along a focusing direction indicated by an arrow "F" in FIG. 2, which is orthogonal to the tracking direction "T", since the focusing coils 15, 15 are located within the magnetic fields generated by the permanent magnets 17, 17 and 17-1, 17-1. When the holder 11 is moved, the leaf springs 13, 13 are elastically deformed about the fixing positions thereof to the connection plate 19.

In the above described arrangement, a laser beam is emitted toward the center of the disk 1, as indicated by an arrow "A" in FIG. 1, from a well-known light source such as a semiconductor laser, not shown. As shown in FIG. 1, the laser beam is emitted toward the center of the disk 1 in parallel to the disk 1 and upwardly reflected by a mirror, not shown, provided under the carriage 3, and finally projected to a surface of the disk 1.

Further, the laser beam is controlled to be ON/OFF-modulated in accordance with the data recorded on the disk 1, the data being recorded on the desired track on the surface of the disk 1.

While, the reflected laser beam from the surface of the disk 1 is reversely propagated along the above mentioned optical pass and entered into a predetermined well-known light receiving element, not shown, the data stored in the disk 1 are regenerated by demodulating the signal corresponding to the reflected light from the disk 1.

As described above, it becomes possible to decrease the total volume of the movable unit by separating the light source and the light receiving element from the movable unit 20. However, it is not possible to move the movable unit 20 very rapidly since the movable unit 20 is guided by the bearings 5, 5 arranged to be movable along the rails 6, 6. In other words, since the movable unit is arranged to be moved by means of a mechanical members, i.e., the bearings 5, 5 and the rails 6, 6, the movable unit 20 can not be moved very rapidly.

In order to solve the above problem, for example, in Patent Provisional Publication HEI 1-106372, disclosed is a movable head provided with a pair of permanent magnets and arranged to be floated in the air by being located within a magnetic field generated by another pair of permanent magnets fixed to the device. In other words, these pairs of permanent magnets are arranged in such a manner that the same pole thereof are opposed to each other and the magnets are repelled from each other, and then, the movable unit fixed to one of pairs of permanent magnets is floated in the air. Therefore, the movable unit can be quickly moved without mechanical members such as bearings and rails.

However, in the above construction of the movable unit, it is difficult to stably move in a predetermined direction, such as the radial direction, since it is floated only by the repelling forces between the pairs of permanent magnets. Further, it is difficult to accurately locate the movable unit at the desired position in the air since the repelling forces are not completely equivalent.

SUMMARY OF THE INVENTION

It is therefore an object of the present invention to provide an improved head driving device capable of smoothly and quickly driving a movable unit comprising an optical head.

For this purpose, according to the present invention, there is provided a movable member locating mechanism for floating a predetermined movable member, which is arranged to be movable along at least one of two axes that are orthogonal with each other, in the air and locating at the desired positions respectively designated along the two axes. The movable member locating mechanism comprises:

a curbing mechanism for floating the predetermined movable member and locating it at the desired position along direction of both of the two axes; and a locating mechanism for locating the predetermined movable member at another desired position along the direction of one of the two axes.

DETAILED DESCRIPTION OF THE PREFERRED EMBODIMENTS

Referring to the drawings, an embodiment of the present invention will be described hereinafter.

Figure 3A:
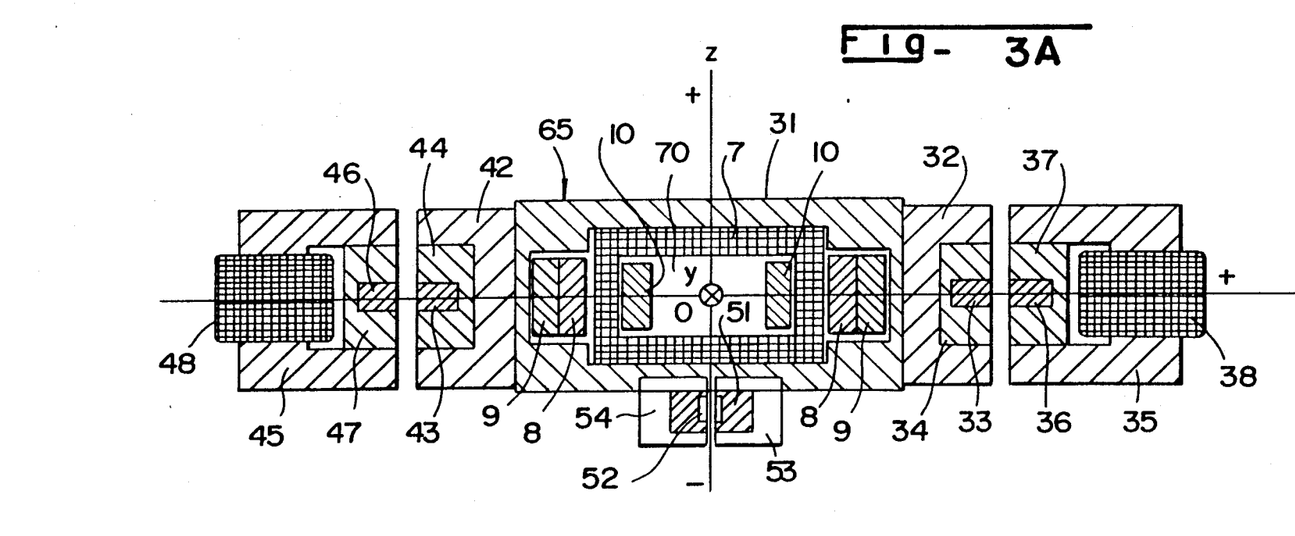
FIGS. 3A and 3B respectively show a vertical sectional view showing an arrangement of the head driving device according to the present invention and a partial enlarged view thereof.
Figure 4:
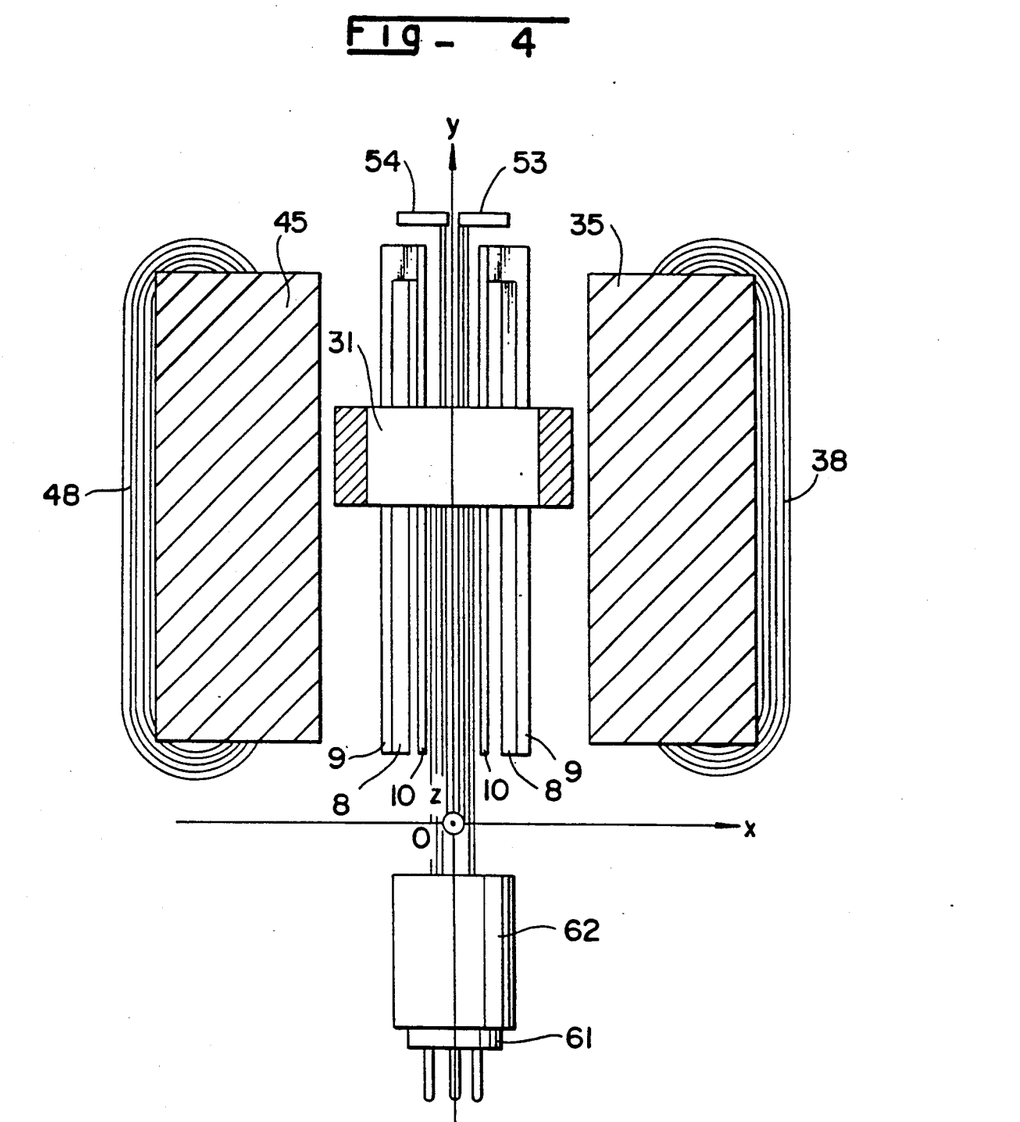
FIG. 4 shows a plane view showing an arrangement in which the head driving device of FIG. 3 is operated.

FIG. 3A shows a vertical sectional view showing an arrangement of the head driving device according to the present invention. FIG. 4 shows a plane view showing an arrangement in which the head driving device of FIG. 3 is operated. In these drawings, numeral 31 indicates a basic holder holding a fine actuator for driving an objective lens along the focusing direction. Numeral 32 indicates a yoke arranged to be fixed to the right side wall of the basic holder 31. A mounting member 34 for mounting a permanent magnet 33 is provided on the yoke 32.

Numeral 35 indicates another yoke arranged to be fixed to a chassis, not shown. As shown in FIG. 4, the longitudinal direction of the yoke 35 is arranged in parallel to the radial direction of the disk, i.e., the y-direction. Numeral 38 indicates a coil that is wound around the yoke 35 in order to generate a magnetic field within the yoke 35. In other words, a magnetic field is generated within the yoke 35 when a predetermined amount of current is flowed through the coil 38. Further, on the yoke 35, a mounting member 37 and a permanent magnet 36 is provided, similar to those for yoke 33. The yoke 35 and the permanent magnet 36, respectively, have sufficient length along the y-direction so that the permanent magnet 36 is always opposed to the permanent magnet 33 in a moving range of the basic holder 31 along the y-direction, as shown in FIG. 4.

Further, as illustrated in FIG. 3A, a through hole 70 along the y-direction is formed on the basic holder 31, and a coil 7 through which electrical current is to be flowed is fixed to the through hole 70. Further, a pair of permanent magnets 8, 8 are provided outside of the coil 7, and a pair of yokes 10, 10 are provided inside of the coil 7. Outside both of the pair of permanent magnets 8, 8, another pair of yokes 9, 9 are provided. These yokes 9, 9, and 10, 10 and permanent magnets 8, 8 are, as illustrated in FIG. 4, respectively extended along the y-direction and fixed to a base unit, not shown.

In other words, the basic holder 31 is arranged to be movable along the y-direction, same as the movable unit 3 shown in FIG. 1.

The coil 7 and the magnet 8, and the basic holder 31 and the yoke 9 are respectively arranged so as to not be contacted with each other even if the basic holder 31 is moved along the x-direction which is orthogonal to the y-direction.

Similar to these members that are located at the right side of the basic holder 31, i.e., yokes 32 and 35, permanent magnets 33 and 36, mounting members 34 and 37, and coil 38, located at the left side of the basic holder 31 are yokes 42 and 45, permanent magnets 43 and 46, mounting members 44 and 47, and coil 48.

Numeral 51 indicates a slit plate, provided beneath the basic holder 31, in which a slit part 52 is formed at the central portion thereof. Numerals 53 and 54 indicate a pair of light receiving elements for receiving light transmitted from a semiconductor laser 61 (FIG. 4) and propagated through a laser pen 62 (FIG. 4). The laser pen 62 includes a collimator lens, not shown, for refracting the entered light thereinto and making the light parallel with each other. The light transmitted from the semiconductor laser 61 is further propagated through the slit part 52.

Next, an operation of the above constructed arrangement including a head driving device will be described hereinafter.

Figure 3B:
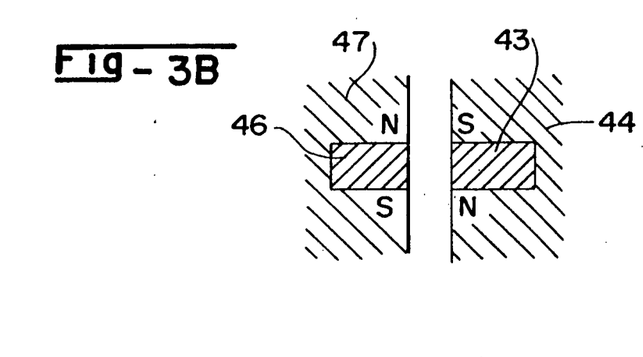

As shown in FIG. 3B, the permanent magnet 46 is arranged in such a manner that an upper part thereof becomes a N-pole, while a lower part becomes a S-pole. On the contrary, the permanent magnet 43 is arranged in such a manner that an upper part thereof becomes a S-pole and a lower part becomes a N-pole. The relationship between the permanent magnets 43 and 46 is employed to the permanent magnets 33 and 36, i.e., an upper part of the permanent magnet 33 and a lower part of the permanent magnet 36 respectively become a S-pole, while a lower part of the permanent magnet 33 and an upper part of the permanent magnet 36 respectively become a N-pole. Therefore, the permanent magnets 33 and 43 fixed to the basic holder 31 are respectively attracted to the permanent magnets 36 and 46, and then, a movable unit 65 which includes the basic holder 31, the yokes 32 and 42, the mounting members 34 and 44 respectively providing the permanent magnets 33 and 43, and slit plate 51 is floated in the air. Further, the movable unit 65 is placed at the zero position along the z-axis. In the above described state, the permanent magnets 43, 46 and 36, 46 are not contacted with each other.

It can be arranged that the permanent magnets 33, 36 and 43, 46 are repelled from each other in order to float the movable unit 65 in the air. However, in this arrangement, it becomes difficult to stably locate the movable unit 65 at the desired position along the z-axis. Accordingly, it is preferable to arrange in such a manner that the permanent magnets are attracted with each other.

Figure 5:
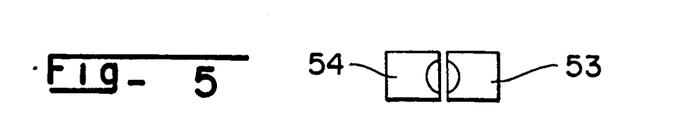
FIG. 5 shows a view showing a relationship between the optical spot and the light receiving element.

In the above constructed arrangement, the laser beams transmitted from the semiconductor laser 61 is further transmitted from the laser pen 62 in parallel with each other, and received by the pair of light receiving elements 53, 54 after propagating through the slit part 52 formed on the slit plate 51 as shown in FIG. 5. In this embodiment, the semiconductor laser 61, the laser pen 62, the slit plate 51 and the pair of light receiving elements 53, 54 are arranged in such a manner that the amount of light received by the respective light receiving elements 53, 54 become similar to each other when the movable unit 65 is located at the central positon between the permanent magnets 36 and 46. In this arrangement, when the movable unit 65 is moved rightward in FIG. 3A, i.e., a positive direction along the x-axis, the amount of light received by the light receiving element 53 is increased, while an amount of light received by the element 54 is decreased. In this case, a predetermined amount of current, corresponding to the difference between these amounts of light received by the respective light receiving elements 53, 54, is flowed through the coil 48 for making the attractive force between the permanent magnets 43 and 46 stronger. Therefore, the movable unit 65 is moved leftward till the amounts of light received by respective light receiving elements 53, 54 are similar to each other. On the contrary, if the movable unit 65 is leftward moved in FIG. 3A, a predetermined amount of current is flowed through the coil 38 and the moved rightward by means of the attractive force made stronger.

As described above, it becomes possible to locate the movable unit 65 at the zero position along the x-axis by means of a so-called servo system.

Figure 6:
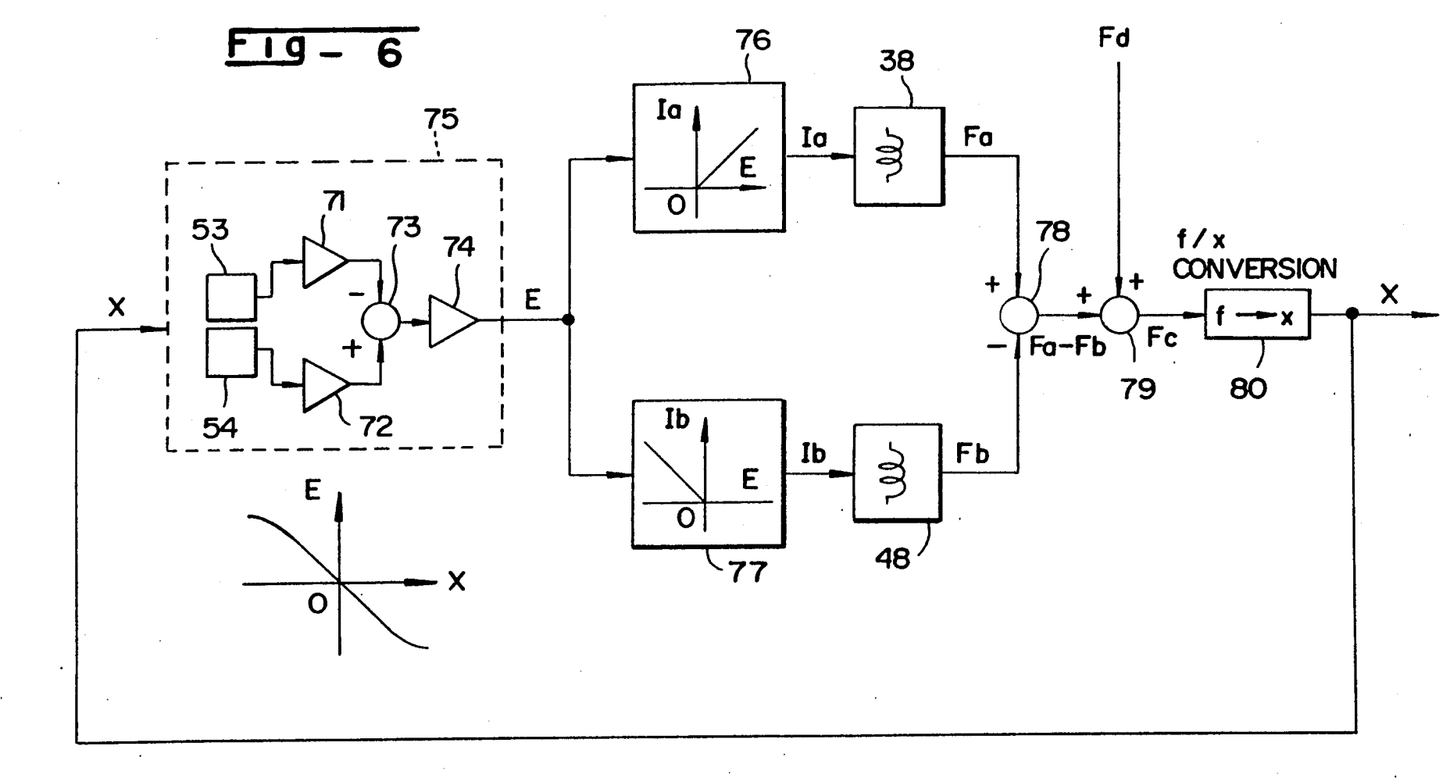
FIG. 6 shows a block diagram showing a servo system for controlling the head driving device shown in FIG. 3A.

FIG. 6 shows a block diagram showing a servo system for controlling the head driving device shown in FIG. 3A. Referring to FIG. 6, an operation of the servo system will be explained hereinafter.

Numeral 75 indicates a displacement detection circuit for generating voltage corresponding to the difference between currents respectively flowed from the pair of light receiving elements 53, 54, i.e., generating voltage corresponding to displacement "x" of the movable unit 65 from the zero position along the x-axis. Each of the light receiving elements 53, 54 are arranged so as to output current corresponding to an amount of light received thereby. The currents outputted from each of the light receiving elements 53, 54 are converted into voltage by means of a pair of amplifiers 71, 72. Numeral 73 indicates a subtracter circuit for forming a difference between the voltage generated by the pair of amplifiers 71, 72. The difference formed by the subtracter circuit 73 is inputted into an amplifier 74, and further, amplified and inputted into a pair of driving circuits 76, 77 as indicated by voltage value "E". In other words, as illustrated in the "x-E" characteristic curve shown below the displacement detection circuit 75 in FIG. 6, the displacement detection circuit 75, including the pair of light receiving elements 53, 54, the amplifiers 71, 72 and 74, and the subtracter circuit 73, is arranged so as to output positive or negative voltage when the movable unit 65 is leftward or rightward moved along the x-axis, and further, the voltage level outputted from the displacement detection circuit 75 corresponds to the amount of displacement of the movable unit 65.

The driving circuit 76 outputs current "Ia", applied to the coil 38, proportional to the positive voltage outputted from the displacement detection circuit 75, while the driving circuit 77 outputs current "Ib", applied to the coil 48, proportional to the negative voltage as shown in FIG. 6. The driving circuit 76 is arranged so as to not output current if a negative voltage is inputted, while the circuit 77 is arranged so as to not output current if a positive voltage is inputted. Therefore, the coil 38 is driven when the movable unit 65 is leftward displaced, while the coil 48 is driven when it is rightward displaced. Further, a pair of attractive forces "Fa" or "Fb", caused by the magnetic fields generated by the coils 38, 48 through which the current is flowed, are inputted into another subtracter circuit 78. The subtraction "Fa−Fb" generated by the subtracter 78 is inputted into an adder circuit 79, and added with a so-called disturbance "Fd", and finally, output "Fc" is formed from the equation Fc=Fa−Fb+Fd. The output "Fc" is converted into displacement "x" at a force-displacement conversion circuit 80, and further, the converted displacement "x" is negatively fed back to the voltage value E at the displacement detection circuit 75, while the movable unit 65 is controlled so as to be moved along the x-axis in accordance with the converted displacement "x". It is noted that force values "Fa" and "Fb" can be mathematically obtained in accordance with the current values "Ia" and "Ib". In other words, the current values "Ia" and "Ib" are converted into the force values in accordance with an intensity of a magnetic field which is proportional to the amount of displacement of the movable unit 65. "Fd" indicates a so-called "disturbance" in a negative feedback system having been determined in advance. Further, in the F/x conversion circuit 80, the displacement to be corrected is mathematically obtained in accordance with the "Fc" obtained by the equation Fc=Fa−Fb+Fd, i.e., the force value "Fc" is converted to the displacement "x" of the movable unit to be corrected. If the movable unit is definitely located at the desired position along the x-direction, the servo system is not operated, the electric current is not generated, and the magnetic field that would result from a flow of the current is not generated.

The subtracter circuit 78, the adder circuit 79 and the force-displacement conversion circuit 80 respectively represent control blocks designed to be operated as described above, and not to be limited to an actual electric circuit.

Since the semiconductor laser 61 as a light source, the pair of light receiving elements 53, 54 and the like, are not mounted on the movable unit 65, the whole volume and the weight can be respectively made small and light. Therefore, the above described course actuator can be utilized as a fine actuator for driving the movable unit 65 along the radial direction of the disk. In this case, only the actuator for driving the movable unit 65 along a focusing direction is mounted on the basic holder 31.

Further, it can be arranged in such a manner that an actuator for tracking the movable unit 65 as well as another actuator for focusing are mounted on the basic holder 31, and that both light source and the light receiving element for receiving the light transmitted therefrom are mounted on the basic holder 31.

In the above described embodiment, the displacement of the movable unit 65 along the x-axis is detected by means of differentiating the amounts of laser beam respectively received by a pair of light receiving elements, it can be arranged in such a manner that the laser beam is used for data recording as well as data regenerating. Further, as the light source, an LED (Light Emitting Diode) can be used instead of the semiconductor laser.

Furthermore, it can be arranged in such a manner that the coils 38, 48 are mounted on the movable unit 65.

As described above, since the movable unit is floated in the air by means of attractive force generated by magnetic field, it can be smoothly and quickly moved without mechanical driving members such as bearings and rails. Further, in the present invention, the movable unit can be controlled so as to be located at the desired position by means of a so-called servo system. In the meantime, the above arrangement can be used in a magnetic head driving mechanism for driving a magnetic head instead of the optical head.

The present disclosure relates to subject matters contained in Japanese patent applications No. 01-290893 and 01-290894, both filed on Nov. 7, 1989 which are expressly incorporated herein by reference in their entireties.

What is claimed is

1. A movable member locating mechanism for floating a predetermined movable member along at least one of two axes which are orthogonal to each other and to the axis of a moving direction, said location mechanism floating said predetermined movable member in the air and locating said predetermined movable member at desired positions respectively designated along the direction of at least one of said two axes, said predetermined movable member being arranged to be movable in said moving direction with respect to said locating mechanism and having at least two side surfaces which are parallel to at least one of said two axes, respectively, said movable member locating mechanism comprising:
   curbing means for floating said predetermined movable member by magnetically curbing and locating it at a predetermined reference position along each of said two axes; and
   means for magnetically locating said predetermined movable member at another position along one of said two axes;
   wherein said curbing means comprises at least two permanent magnets respectively fixed to said at least two side surfaces of said predetermined movable member which are in parallel to said one of said two axes, and at least two additional permanent magnets respectively oppositely arranged so as to be attracted to said at least two permanent magnets, said additional permanent magnets being fixed to a device in which said movable member locating mechanism is positioned, whereby said predetermined movable member is floated in the air and located between each of said additional permanent magnets and at a desired position along at least one of said two axes.

2. The movable member locating mechanism of claim 1, wherein said predetermined movable member is movable with respect to said locating means along both of said two axes.

3. The movable member locating mechanism according to claim 1, wherein said at least two permanent magnets each have upper and lower parts and are respectively arranged in such a manner that said upper parts along said one of said two axes and said lower parts therealong become opposite poles in respect to each other.

4. The movable member locating mechanism according to claim 1, wherein said locating means comprises detecting means for detecting a displacement direction as well as an amount of displacement of said predetermined movable member from said another position along one of said two axes, and means for driving said movable member toward said another position in accordance with said displacement direction detected by said detecting means.

5. The movable member locating mechanism according to claim 4, wherein said detecting means comprises a pair of light receiving elements, arranged in a row along the other of said two axes, for respectively receiving light transmitted from a predetermined light source, said predetermined light source being located at a side of said predetermined movable member which is opposite the location of said light receiving elements, and a slit plate provided on said movable member having a slit part through which light from said light source is propagated, whereby the amount of light respectively received by each of said pair of light receiving elements is varied as said movable member is displaced along one of said two axes.

6. The movable member locating mechanism according to claim 4, wherein said driving means comprises a pair of attracting members each of which attracts one of said additional permanent magnets toward the opposed one of said at least two permanent magnets in accordance with said displacement direction detected by said detecting means.

7. The movable member locating mechanism according to claim 6, wherein said pair of attracting members comprises a pair of side coils, respectively provided near each of said additional permanent magnets, through which electric current corresponding to the amount of displacement of said predetermined movable member is flowed for generating a magnetic field whose intensity corresponds to the amount of displacement of said movable member, the electric current being flowed through said side coil which is opposite the displacement direction of said movable member, whereby the attracting force between one of said at least two permanent magnets and one of said additional permanent magnets, respectively located at the opposite side of the displacement direction about said another position, is made stronger based upon the amount of displacement of said movable member and said movable member is driven to move toward said another position.

8. The movable member locating mechanism according to claim 5, wherein said predetermined light source comprises a semiconductor laser.

9. The movable member locating mechanism according to claim 1, further comprising means for driving said predetermined movable member along a predetermined axis which is orthogonal to said one of said two axes as well as the other of said two axes.

10. An optical head locating mechanism for locating an optical head having at least two side surfaces extending along a tracking direction and adapted to be positioned in an optical device at a desired, said optical head locating mechanism comprising:
   first locating means for floating said optical head and locating it at a predetermined reference position along a focusing direction and along a direction which is orthogonal to both focusing and tracking directions; and
   second locating means for locating said optical head at a second position along said direction which is orthogonal to both said focusing and tracking direction, said optical head further being movable with respect to said optical head locating mechanism in said tracking direction;
   wherein said first locating means comprises at least two permanent magnets respectively fixed to said side surfaces of said optical head extending along said tracking direction which are in parallel to said focusing direction, and additional permanent magnets attracted to said at least two permanent magnets, said additional permanent magnet being fixed to said optical device, whereby said optical head is floated in the air and located between each of said additional permanent magnets and at a predetermined reference position along said focusing direction.

11. The optical head locating mechanism of claim 10, wherein said optical head further comprises an objective lens aligned along an optical axis, and means for moving said optical head along the direction of said optical axis.

12. The optical head locating mechanism according to claim 10, wherein said at least two permanent magnets each have upper and lower parts and are respectively arranged in such a manner that an upper part along said focusing direction and a lower part therealong become the opposite poles in respect to each other.

13. The optical head locating mechanism according to claim 10, wherein said second locating means comprises means for detecting a displacement direction as well as an amount of displacement of said optical head from said second desired position, and means for driving said optical head toward said second desired position in accordance with said displacement direction detected by said detecting means.

14. The optical head locating mechanism according to claim 13, wherein said detecting means comprises a pair of light receiving elements, arranged in a row along said displacement direction, for respectively receiving light transmitted from a predetermined light source, said predetermined light source being located at a side of said optical head which is opposite the location of said light receiving elements, and a slit plate provided on said optical head having a slit part through which light from said light source is propagated, whereby the amounts of light respectively received by each of said pair of light receiving elements is varied as said optical head is displaced along said displacement direction.

15. The optical head locating mechanism according to claim 13, wherein said driving means comprises a pair of attracting members each of which further attracts one of said additional permanent magnets toward the opposed one of said at least two permanent magnets in accordance with said displacement direction detected by said detecting means.

16. The optical head locating mechanism according to claim 15, wherein said pair of attracting members comprises a pair of side coils, respectively provided near each of said additional permanent magnets, through which electric current corresponding to the amount of displacement of said optical head is followed for generating a magnetic field whose intensity corresponds to the amount of displacement of said optical head, the electric current being flowed through said side coil which is opposite the displacement direction of said optical head, whereby the attracting force between one of said at least two permanent magnets and one of said additional permanent magnets, respectively located at the opposite side of the displacement direction about said another position is made stronger based upon the amount of displacement of said optical head and said optical head is driven to move toward said second position.

17. The optical head locating mechanism according to claim 14, wherein said predetermined light source comprises a semiconductor laser.

18. The optical head locating mechanism according to claim 10, further comprising means for driving said optical head along said tracking direction.

19. The optical head locating mechanism according to claim 18, wherein said optical head floats with respect to said means for driving said optical head in a tracking direction.

20. The optical head locating mechanism according to claim 18, wherein said optical head moves along said tracking direction, relative to said means for driving said optical head in a tracking direction.

21. An optical head locating mechanism, for locating an optical head adapted to be positioned in an optical device at a desired point, said optical head having side surfaces extending along a tracking direction, said locating mechanism comprising at least two permanent magnets respectively fixed to said side surfaces of said optical head extending along a tracking direction, said side surfaces being parallel to a focusing direction, and additional permanent magnets respectively arranged to be attracted to said at least two permanent magnets, said additional permanent magnets being fixed to said optical device, whereby said optical head is floated in the air and located between said additional permanent magnets and at a predetermined reference position along said focusing direction, said optical head locating mechanism further comprising:
   means for detecting a displacement direction as well as an amount of displacement from another position of said optical head along a direction orthogonal to said tracking direction and orthogonal to said focusing direction; and
   means for driving said optical head toward said another position in accordance with said displacement direction detected by said detecting means, said optical head further being movable along said tracking direction with respect to said optical head locating mechanism.

22. The optical head locating mechanism according to claim 21, wherein said detecting means comprises a pair of light receiving elements, arranged in a row along said displacement direction, for respectively receiving light transmitted from a semiconductor laser which is located at a side of said optical head which is opposite the location of said light receiving elements, and a slit plate provided on said optical head having a slit part through which light from said semiconductor laser is propagated, whereby the amount of light respectively received by each of said pair of light receiving elements is varied as said optical head is displaced along said displacement direction.

23. The optical head locating mechanism according to claim 21, wherein said driving means comprises attracting members for further attracting one of said additional permanent magnets toward said oppositely located one of said at least two permanent magnets in accordance with said displacement direction detected by said detecting means.

24. The optical head locating mechanism according to claim 23, wherein said attracting members comprise a pair of side coils, respectively provided near each of said additional permanent magnets, through which electric current corresponding to the amount of displacement of said optical head is flowed for generating a magnetic field whose intensity corresponds to the amount of displacement of said optical head, the electric current being flowed through said side coil which is opposite the displacement direction of said optical head, whereby the attracting force between one of said pair of permanent magnets and one of said additional permanent magnets, respectively located at the opposite side of the displacement direction about said another desired position, is made stronger based upon the amount of displacement of said optical head and said optical head is driven to move toward said another position.

25. The optical head locating mechanism according to claim 21, further comprising means for driving said optical head along said tracking position.

* * * * *

UNITED STATES PATENT AND TRADEMARK OFFICE
CERTIFICATE OF CORRECTION

PATENT NO. : 5,191,570
DATED : March 2, 1993
INVENTOR(S) : T. SHIRAI

It is certified that error appears in the above-indentified patent and that said Letters Patent is hereby corrected as shown below:

On the cover of the printed patent, section [57], in the Abstract, line 9, insert ---.--- after "further".
    At column 9, line 9 (claim 10, line 4), insert ---point--- after "desired".
    At column 9, line 28 (claim 10, line 23), change "magnet" to ---magnets---.
    At column 9, line 64 (claim 14, line 11), change "amounts" to ---amount---.
    At column 10, line 11 (claim 16, line 6), change "followed" to ---flowed---.

Signed and Sealed this

Sixteenth Day of August, 1994

BRUCE LEHMAN

*Attest:*

*Attesting Officer*      *Commissioner of Patents and Trademarks*